United States Patent [19]

Bright

[11] 4,196,546

[45] Apr. 8, 1980

[54] CHANNEL-SHAPED SEALING, GUIDING OR FINISHING STRIPS

[75] Inventor: Robert G. Bright, Viersen, Fed. Rep. of Germany

[73] Assignee: Draftex Development A.G., Zug, Switzerland

[21] Appl. No.: 901,201

[22] Filed: Apr. 28, 1978

[30] Foreign Application Priority Data

Apr. 28, 1977 [GB] United Kingdom ............... 17705/77

[51] Int. Cl.² .............................................. E06B 7/16
[52] U.S. Cl. ......................................... 49/490; 49/440
[58] Field of Search .......................... 49/490, 491, 440

[56] References Cited

U.S. PATENT DOCUMENTS

| | | | |
|---|---|---|---|
| 3,371,447 | 3/1968 | Ruff et al. ............................ | 49/490 |
| 3,993,819 | 11/1976 | Fewkes ............................... | 49/490 X |

*Primary Examiner*—Kenneth Downey
*Attorney, Agent, or Firm*—Leydig, Voit, Osann, Mayer & Holt, Ltd.

[57] ABSTRACT

There is disclosed a channel-shaped sealing strip incorporating a metal carrier covered with flexible material, the metal carrier comprising a series of side-by-side U-shaped elements each of which is connected to the next element by at least one connecting link. At least during the manufacturing process for the strip, adjacent elements are also connected by at least one other connection whose thickness is reduced compared with the connecting link and with the remainder of the metal; these other connections may, and advantageously do, break during the manufacturing process so that, in the finished strip, each U-shaped element is connected to the next element by the connecting link but is also spaced therefrom by distance pieces formed from the broken-off connections.

6 Claims, 5 Drawing Figures

CHANNEL-SHAPED SEALING, GUIDING OR FINISHING STRIPS

BACKGROUND OF THE INVENTION

The invention relates to channel-shaped sealing, guiding or finishing strips such as for sealing around door or window openings, for receiving and guiding window glass and for fitting onto edge flanges and the like, such structures being suitable, for example, for employment in vehicle body construction and being hereinafter referred to as channel-shaped sealing strips.

Channel-shaped sealing strips are known comprising metal cores or carriers covered with flexible (e.g. elastomeric) material. Such metal carriers may take the form of a plurality of U-shaped metal elements connected by metal connecting links.

It is known, and desirable, for such metal connecting links to be designed so as to give the metal carrier good flexibility to enable the finished structure to be readily bent round curves and corners. However, this flexibility may be disadvantageous during manufacture of the strip because it may make the strip liable to breakage (particularly before the carrier is covered with the flexible material) especially if it is subjected to longitudinal pull. Furthermore, such pull may undesirably stretch the structure.

An object of the invention is to provide a structure and a method of making such a structure which eliminate or mitigate these problems.

BRIEF SUMMARY OF THE INVENTION

According to the invention, there is provided a channel-shaped sealing strip incorporating a metal carrier covered with flexible material, the metal carrier comprising a series of side-by-side U-shaped elements each of which is connected to the next element by at least one connecting link and at least one other connection whose thickness is reduced compared with the connecting link and with the remainder of the metal.

According to the invention, there is also provided a channel-shaped sealing strip, comprising a metal carrier covered with flexible material, in which the carrier comprises a series of side-by-side U-shaped elements each of which is connected to the next element by a connecting link or area but is also spaced therefrom by a distance piece which extends towards a similar distance piece on the next element.

According to the invention, there is further provided a method of making a metal carrier, for a channel-shaped sealing strip, comprising the steps of forming a flat metal blank whereby to provide a plurality of transverse slots which divide the blank into transverse elements each connected to the next by at least one connecting link and at least one connection which is of thinner metal than the connecting link.

According to the invention, there is yet further provided a method of making a channel-shaped sealing strip, comprising the steps of forming a longitudinally extending thin metal blank with a first series of transversely extending parallel slits each of which is positioned symmetrically with resepct to the central longitudinal axis of the blank and ends short of each margin of the blank by a first, relatively large, distance, forming a second series of transversely extending parallel slits each of which slightly overlaps an associated one of the slits of the first series and extends towards one of the margins of the blank to end short of that margin by a second, relatively small, distance, whereby the second series of slits leave an unslit region extending along the said one margin of the blank, forming a third series of transversely extending parallel slits each of which slightly overlaps an associated one of the slits of the first series and extends toward the other of the margins of the blank to end short of that margin by a relatively small distance corresponding to the said second distance, whereby the third series of slits leave an unslit region extending along the said other margin of the blank, thinning down the metal of the blank along both said unslit regions whereby to expand the slits into slots and to provide a structure comprising a series of transversely extending side-be-side and substantially parallel elements each of which is connected to the adjacent element by two thinned down marginal connections respectively lying in the two unslit regions and by two connecting links respectively corresponding to the portions of the metal of the blank where the slits of the second and third series overlap the slits of the first series, these connecting links being inclined to the said axis, covering the blank with elastomeric material, and bending the so-covered blank into channel-form whereby to rupture the marginal connections but not the connecting links.

BRIEF DESCRIPTION OF THE DRAWINGS

Channel-shaped sealing strips embodying the invention will now be described, by way of example only, with reference to the accompanying diagrammatic drawings in which.

DESCRIPTION OF PREFERRED EMBODIMENTS

The sealing strips to be described are in the form of flange finishers, that is, strips of channel-shape made of a metal core or carrier which is covered with flexible covering material such as elastomeric material. In use, they are mounted on a flange surrounding a door opening, such as a door opening in a vehicle body, the flange entering the channel through its open mouth and being gripped by the sides of the channel or by gripping ribs therein. In this way the strip protects and decorates the flange and may carry a soft sealing section for providing weather-proofing. However, the invention is applicable to other forms of sealing strip.

Figure 1:
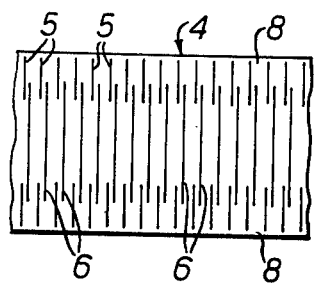
FIG. 1 is a plan view of a metal blank from which is to be formed a metal core or carrier for the strip, the blank being shown after an initial stage in its manufacture.

The metal carrier 4 is made from a blank of thin metal, such as steel. As shown in FIG. 1, an initial stage in the manufacture of the carrier involves the provision of slits 5 and 6 in the metal blank. As shown, each slit 5 starts at a position spaced slightly inwardly of one of the margins of the blank and extends for a short distance across the blank in alignment with a corresponding slit 5 on the opposite edge of the blank. The slits 5 thus leave unslit marginally extending regions 8 extending along the two margins of the blank. Each such marginally extending region may be, say, 1.0 mm wide.

The slits 6 are interspersed with the slits 5 and overlap them, each slit 6 extending across the width of the blank but terminating sufficiently short of the marginal edges of the marginally extending regions 8.

The slits 5 and 6 may be produced by any suitable process, such as by pressing.

The metal blank, in the form shown in FIG. 1, then passes between rollers. The rollers are arranged in two pairs. The rollers of one pair are respectively arranged above and below the blank in alignment with the marginally extending region 8 on one side of the blank, while the other rollers are similarly arranged in relation to the marginally extending region 8 on the opposite side of the blank. The rollers each have a width of, say, 2 mm.

The separation between the rollers of each pair is such that the material of the blank is substantially reduced in thickness as it passes between the rollers, the reduction in thickness being, say, 50%. Therefore, the blank emerges from the rollers with two thinned-down margins, each such margin including but being wider than a respective one of the marginally extending regions 8.

Figure 2:
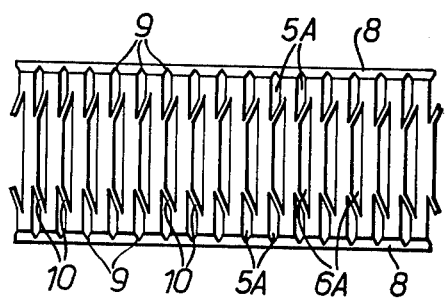
FIG. 2 shows the metal blank of FIG. 1 after a later stage in its manufacture.

The blank therefore emerges from the rollers in the form shown in FIG. 2, the thinning-down of its margins having had the effect of opening the slits 5 and 6 into slots, thereby stretching the blank. Thus, the slits 5 have become slots 5A and the slits 6 have become slots 6A. The metal between the overlapping portions of the slits 5 and 6 (see FIG. 1) become formed into inclined links 10, while the thinned-down metal in the marginally extending regions 8 (FIG. 1) at the end of the slits 5 produce marginal connections 9.

Figure 3:
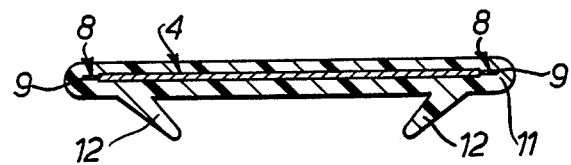
FIG. 3 is a cross-section of the blank of FIG. 3 after covering with elastomeric material by extrusion.

The blank in the form shown in FIG. 2 is then passed into an extruder by means of which a covering of elastomeric material 11 is extruded over it as shown in cross-section in FIG. 3. The extruder may, for example, be a cross-head extruder of known form.

Figure 4:
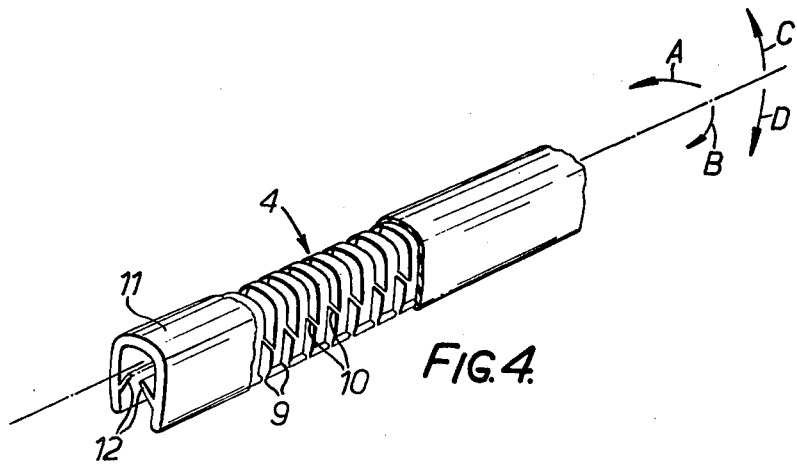
FIG. 4 is a perspective view of the finished sealing strip, with part of it broken away to show the metal core or carrier.

The strip in the form shown in FIG. 3 is then passed between further rollers which bend the strip into channel-form so that it emerges in the shape shown in FIG. 4.

Where the elastomeric material 11 is broken away in FIG. 4 to reveal the metal carrier 4, it will be noted that the marginal connections 9 are broken. They become broken, because of their thin and therefore relatively weak state, during the operation which bends the strip of FIG. 3 into channel form. The result is therefore, that the carrier 4, in its finished form, consists of a series of side-by-side U-shaped elements interconnected by inclined links 10. These links, being inclined, enable the finished strip to have reasonable flexibility in the directions of the arrow A and B as well as in the directions of the arrows C and D, and the strip can therefore be relatively easily bent in order to accommodate curves and bends in an edge flange to which it is to be fitted in use.

The fact that the U-shaped elements are continuously connected in use (by the links 10) increases the constancy of the gripping force which the finished strip exerts on the sides of the flange to which the strip is fitted in use.

The broken off marginal connections 9 form distance pieces to maintain separation between the U-shaped elements and need not be spaced as illustrated in FIG. 4 but may be in contact.

The extrusion process is arranged to provide gripping ribs 12 running along the inside walls of the channel, and in use these gripping ribs help to retain the strip on the edge flange and provide an additional weather and draughtproof seal. There may of course be more or less numbers of gripping ribs, not necessarily equal numbers of each side of the strip.

The marginal connections 9 are advantageous because they provide an important increase in the strength of the blank during its forming process. Without the marginal connections 9, there is the risk that, as the blank progresses through the various manufacturing stages, the links 10 will be unable to withstand the longitudinal pull which may be exerted on the blank and will break, thus of course interrupting the process. The fact that the marginal connections are relatively weak and therefore break during the final manufacturing stage ensures that they do not adversely affect the flexibility of the final strip.

The fact that the U-shaped elements of FIG. 4 still remain connected (by the inclined links 10) in the finished strip (that is, they do not become completely disconnected from each other) is advantageous because it gives the strip considerably increased resistance to shrinkage or stretching. In use, it will be appreciated that the strip has to be cut into lengths suitable for each aplication. It has been found with strips employing metal carriers which, in their finished state, comprise disconnected U-shaped elements, that the individual lengths tend to shrink (or possibly stretch) after cutting, particularly in response to temperature changes. This means that the individual lengths may be found to be outside tolerance when they come to be fitted onto a particular edge flange.

The continuous connection provided by the links 10 is particularly advantageous in controlling stretch where the finished strip has to be bent round curves or corners in use.

In cases where additional control against stretch is required, a longitudinal thread (made of suitable stretch-resistant flexible material, e.g. Nylon (Trade Mark) may be used and positioned to run along the length of the carrier and to be covered by the elastomeric material 11. The thread may be positioned inside or outside the channel-shape of the carrier; advantageously, it is positioned to run along the outside of the base of the channel.

The metal carrier may take many different forms. For example, it is not necessary for there to be two links 10 between adjacent legs. There could for example be only one such link which could be positioned either to one side of the longitudinal axis of symmetry or on that axis. Furthermore, it is not necessary for the thinned-down regions 8, and the connections 9, to be positioned on the margins of the blank; they could be positioned elsewhere. Wherever positioned, there need only be one thinned-down region, producing one set of connections 9.

It is not essential in all applications that the marginal connections 9 do break. In some applications, they may be allowed to remain intact even in the finished strip.

Figure 5:
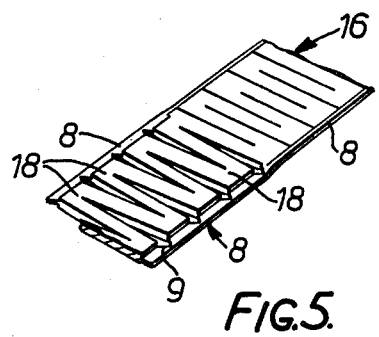
FIG. 5 is a perspective view of another form of the carrier, at a stage in its manufacture corresponding to that shown in FIG. 2.

FIG. 5 shows a plan view of another form of carrier, 16, at a stage corresponding generally to the stage shown in FIG. 2 for the first form of carrier described. The carrier is formed by slitting a blank and then stretching it by rolling down its marginal regions 8.

FIG. 5 showing some of the blank stretched in this way and some not stretched. The carrier therefore comprises elements which are joined together by links or areas 18 and also by marginal connections 9 corresponding to the marginal connections 9 of FIG. 2. The carrier in the form shown in FIG. 5 would then be covered with elastomeric material such as by an extrusion process and then bent into channel-form to produce a configuration generally similar to that shown in FIG. 4. As before, this bending operation would advantageously break the marginal connections 9, thus leaving the metal carrier to comprise U-shaped elements merely joined together by the connecting links or areas 18.

As before, the marginal connections 9 serve the purpose of strengthening the carrier while it is being processed.

What is claimed is:

1. A channel-shaped sealing strip, comprising
    a metal carrier covered with flexible material,
    the metal carrier comprising a series of side-by-side U-shaped elements each of whose legs is connected to the corresponding leg of the next element on each side of it by a respective connecting link which is inclined to the direction of extension of the leg,
    each leg of each element also being connected to the corresponding leg of the next element on each side of it by a respective connection which is closer to the distal end of that leg than the said connecting link, which extends substantially perpendicularly between the legs which it connects and whose thickness is reduced compared with the connecting link and with the remainder of the metal so as to render it readily breakable between the legs which is connects,
    the inclined connecting links providing the strip with longitudinal flexibility when the said connections have been broken.

2. A strip according to claim 1, including a stretch-resistant thread running along the length of the carrier and covered by the flexible material.

3. A method of making a metal carrier for a channel-shaped sealing strip, comprising the steps of
    forming a flat metal blank whereby to provide a plurality of transverse slots which divide the blank into transverse elements each connected to the next by two connecting links and by two connections which are of thinner metal than the connecting links,
    the step of forming the said slots being such that each said connecting link has a configuration in which at least a portion of it is inclined with respect to the axis of symmetry extending along the blank, and each said connection extending substantially perpendicular to the elements which it connects,
    the said connections being arranged along respective lines respectively positioned along the two margins of the blank,
    longitudinally pulling the blank through extruding means which extrudes flexible covering material completely around the blank and so that the pulling force on the strip is substantially completely taken by the marginal connections,
    bending the covered blank into channel form, and
    breaking the marginal connection between each pair of elements after the blank has been covered with the flexible material.

4. A method according to claim 3, including the steps of forming the metal blank with transversely extending slits which are arranged to leave an unslit region extending along at least one margin of the blank, and thinning down the metal of the blank along the said region so as to expand the slits into the said slots.

5. A method according to claim 4, in which the step of forming the metal blank with the transversely extending slits is such as to leave unslit regions extending along both margins of the blank, and the thinning down step thins down both the said regions to produce said marginal connections lying in each unslit region, the slits being arranged such that the connecting links are inboard of the marginal connections.

6. A method of making a channel-shaped sealing strip, comprising the steps of
    forming a longitudinally extending thin metal blank with a first series of transversely extending parallel slits each of which is positioned symmetrically with respect to the central longitudinal axis of the blank and ends short of each margin of the blank by a first, relatively large, distance,
    forming a second series of transversely extending parallel slits each of which sightly overlaps an associated one of the slits of the first series and extends towards one of the margins of the blank to end short of that margin by a second, relatively small, distance, whereby the second series of slits leave an unslit region extending along the said one margin of the blank,
    forming a third series of transversely extending parallel slits each of which slightly overlaps an associated one of the slits of the first series and extends towards the other of the margins of the blank to end short of that margin by a relatively small distance corresponding to the said second distance, whereby the third series of slits leave an unslit region extending along the said other margin of the blank,
    thinning down the metal of the blank along both said unslit regions whereby to expand the slits into slots and to provide a structure comprising a series of transversely extending side-by-side and substantially parallel elements each of which is connected to the adjacent element by two thinned-down marginal connections respectively lying in the two unslit regions and by two connecting links respectively corresponding to the portions of the metal of the blank where the slits of the second and third series overlaps the slits of the first series, these connecting links being inclined to the said axis,
    covering the blank with elastomeric material, and
    bending the so-covered blank into channel-form whereby to rupture the marginal connections but not the connecting links.

* * * * *